United States Patent [19]

De Feo et al.

[11] 3,886,816

[45] June 3, 1975

[54] BIDIRECTIONAL PLANETARY GEAR TRANSMISSION

[75] Inventors: Angelo De Feo, Totowa Boro; Harry N. Price, Elmwood Park, both of N.J.

[73] Assignee: Curtiss-Wright Corporation, Wood-Ridge, N.J.

[22] Filed: Oct. 1, 1973

[21] Appl. No.: 402,295

[52] U.S. Cl............................ 74/764; 74/674
[51] Int. Cl...................... F16h 57/10; F16h 37/06
[58] Field of Search ............ 74/764, 753, 803, 674

[56] References Cited
UNITED STATES PATENTS

| | | | |
|---|---|---|---|
| 2,251,625 | 8/1941 | Hale | 74/764 X |
| 2,445,573 | 7/1948 | Godbe, Jr. | 74/764 |
| 2,466,949 | 4/1949 | Highberg | 74/764 X |
| 3,049,340 | 8/1962 | Magnuson | 74/764 X |
| 3,646,834 | 3/1972 | Davis | 74/674 |

FOREIGN PATENTS OR APPLICATIONS 685,688  5/1964  Canada.................... 74/764

*Primary Examiner*—Samuel Scott
*Assistant Examiner*—P. S. Lall
*Attorney, Agent, or Firm*—Arthur Frederick

[57] ABSTRACT

The bidirectional planetary gear transmission has a pressurized fluid actuated friction brake assembly for selectively braking alternately the planetary gear carrier and ring gear to effect rotation of an output shaft in one direction and the opposite direction. A locking means is provided to hold the planetary gear carrier or ring against rotation, whichever one is associated with prolonged rotation, without maintaining braking of the pressurized fluid actuated brake assembly. Another feature is that the pressurized fluid actuated friction brake assembly has two brake sets (one coacting with the planetary gear carrier and the other with the ring gear) and a dual piston-cylinder mechanism in which the pistons are connected for conjoined reciprocation so that when one brake set is engaged, the other is automatically disengaged.

5 Claims, 11 Drawing Figures

BIDIRECTIONAL PLANETARY GEAR TRANSMISSION

The invention herein described was made in the course of or under Contract No. 1-35536 with the Maritime Administration and the Government is licensed under the patent and has reserved the rights set forth in Sections 1(f) and 1(g) of the Oct. 10, 1963, Presidential Statement of Governmental Patent Policy.

This invention relates to planetary gear transmissions and, more specifically to bidirectional planetary gear transmissions.

BACKGROUND OF THE INVENTION

In planetary gear transmissions for marine propulsion application as exemplified in the U.S. Pat. to Davis, No. 3,646,834, the transmissions must be capable of affecting change in rotation of an output shaft or propeller shaft. It is well known that in planetary gear assemblies driven by the sun gear, opposite directions of rotation of the output shaft may be achieved by alternately braking and holding the planetary gear carrier and the ring gear against rotation and alternately connecting the non-braked carrier and ring gear to the propeller shaft, through a clutch assembly, preferably of the synchronous type, such as disclosed in the U.S. Pat. Nos. 3,709,343 and 3,646,834. In such a planetary gear transmission a multi-disc type brake assembly may be employed to selectively hold or brake the planetary gear carrier and ring gear against rotation. To insure that the brake assembly is incapable of being made to simultaneously hold both the planetary gear carrier and the ring gear against rotation which would severely damage the transmission, the present invention contemplates a multi-disc type brake assembly having two sets of brake plates which are alternately engaged by actuation of the associated piston of an interconnected dual cylinder-piston mechanism. Obviously, in the forward mode of operation which is normally sustained for long periods by a vessel, it is undesirable and uneconomical to maintain fluid pressure against the piston to maintain the forward mode set of brake plates in engagement. Accordingly, the present invention contemplates a mechanical locking means for holding against rotation the carrier or gear associated with the forward drive mode of operation after disengagement of the forward mode brake set.

Is is, therefore, an object of this invention to provide a bidirectional planetary gear transmission having a brake means, including pressurized fluid, rectilinear, motor means for selectively effecting opposite directions of output rotation, which transmission is capable of sustained forward mode operation efficiently and economically.

It is another object of this invention to provide a bidirectional planetary gear transmission having a brake means for selectively arresting rotation of the planetary gear carrier and ring gear to effect opposite output rotation in which inadvertent simultaneous arresting of rotation of the planetary gear carrier and ring gear is obviated.

It is a further object of the present invention to provide a bidirectional planetary gear transmission having a brake means, including a pressurized fluid, rectilinear, motor means for providing a predetermined direction of propulsion, which transmission does not require the continuous application of pressurized fluid to the motor means during sustained forward mode operation.

SUMMARY

Accordingly, the present invention contemplates a novel bidirectional planetary gear transmission which comprises a conventional planetary gear train in which a sum gear is driven by a source of rotary power, the ring gear and a planetary gear carrier being alternately connected to an output shaft, through a clutch assembly, preferably of the synchronous type, to provide for rotation in opposite directions. To selectively switch from one direction to another, a friction brake assembly is provided to alternately arrest the rotation of the planetary gear carrier and the ring gear. The friction brake assembly consists of two brake sets, one of which is a forward mode brake set and the other a reverse mode brake set and a pressurized fluid, rectilinear, motor means, such as a hydraulic dual cylinder-piston mechanism having the pistons connected for conjoined reciprocative movement. In accordance with this invention, a locking means is provided to coact with the forward mode brake set to hold the associated reaction member (carrier or ring gear depending upon which one is required to be held to achieve forward propulsion) against rotation so that pressurized fluid to the motor means can be discontinued during the usually long periods that the vessel is being propelled in a forward direction.

The locking means comprises teeth means or spline means on a member which is connected for conjoined rotation with the reaction member and spline means on a member which is linearly movable but rotatively fixed, the splines being constructed and arranged to interlock in the locked or engaged position. The locking means also includes actuating means, such as a hydraulic piston-cylinder mechanism, and a camming means for insuring proper alignment of the splines prior to moving into interlocking or meshing relationship.

A feature of this invention is a brake assembly which comprises a cylinder-piston mechanism having a piston for the forward mode brake set and a piston for the reverse mode brake set, which pistons are connected for conjoined movement so that both brake sets cannot be inadvertently actuated simultaneously to the engaged or braked position. Another feature of this brake assembly is that when neither the forward mode brake set nor the reverse mode brake sets are energized, the brake assembly is in a neutral position with neither forward mode brake set nor reverse mode brake set in engagement.

BRIEF DESCRIPTION OF THE DRAWINGS

The invention will be more fully understood from the following detailed description thereof when considered in connection with the accompanying drawings wherein one embodiment of the invention is illustrated and in which.

DESCRIPTION OF THE PREFERRED EMBODIMENT

Figure 1:
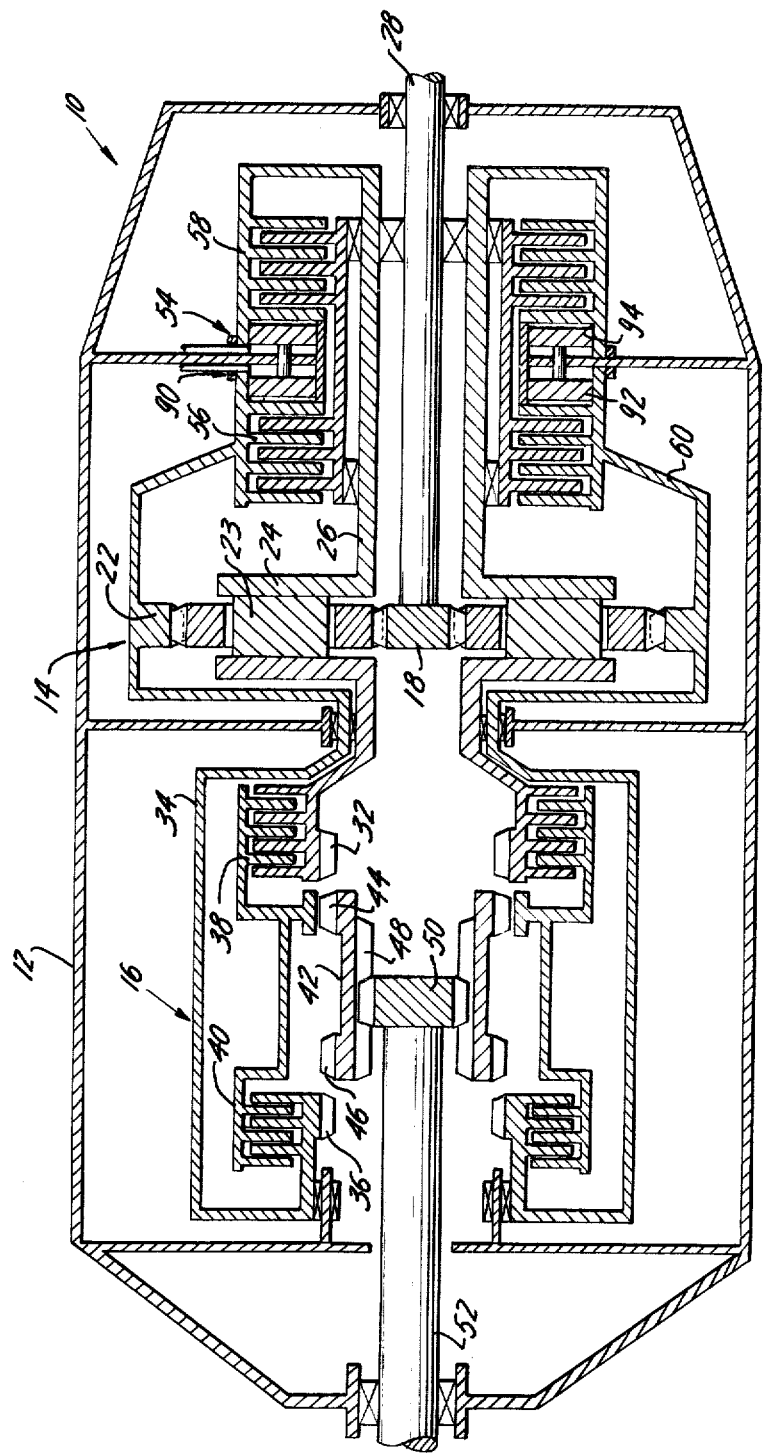
FIG. 1 is a schematic view of a bidirectional planetary gear transmission according to this invention.
Figure 2:
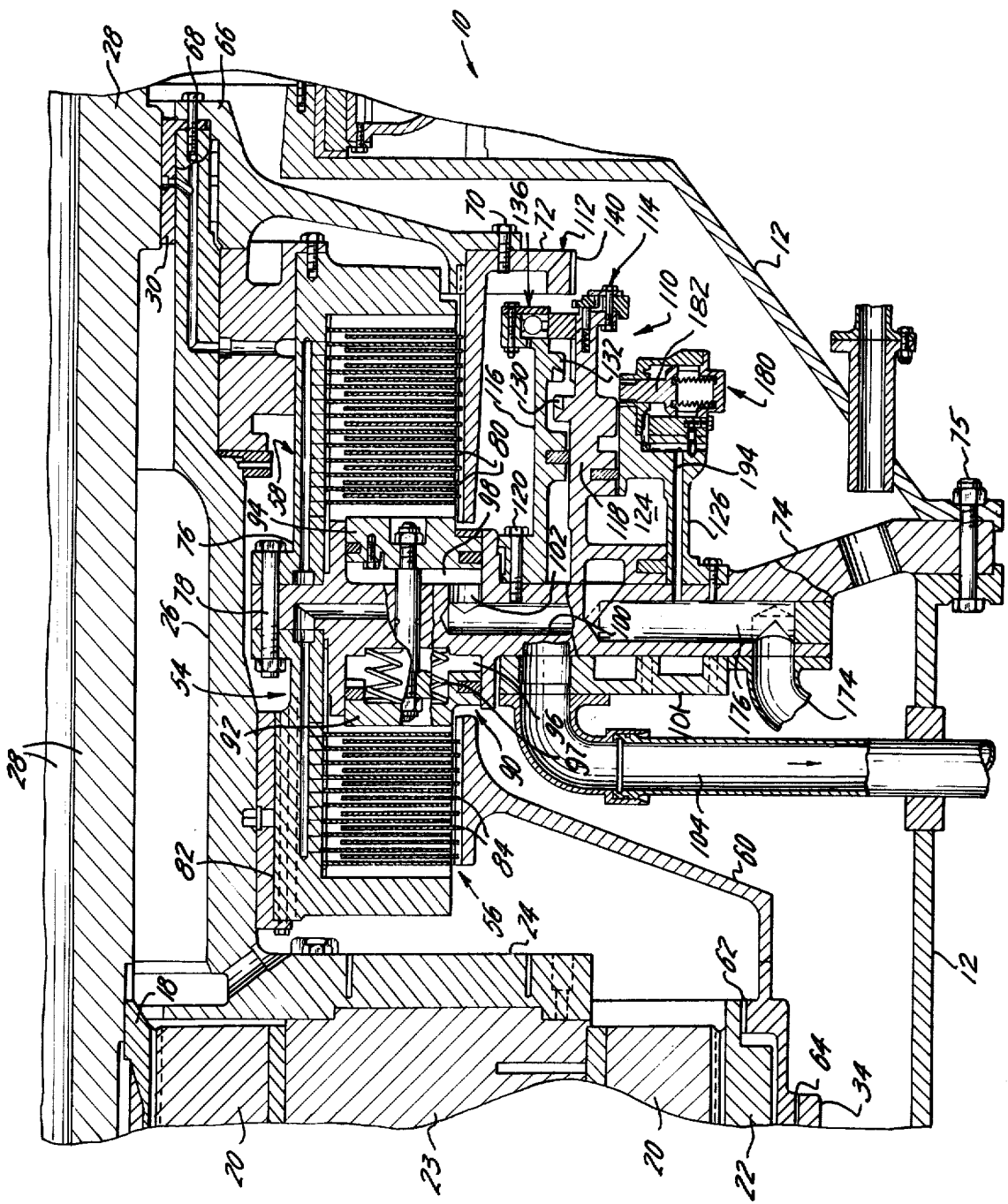
FIG. 2 is a fragmentary view in cross-section of the bidirectional planetary gear transmission according to this invention.

Now referring to the drawings and more particularly FIGS. 1 and 2, the reference number 10 generally refers to a bidirectional planetary gear transmission according to this invention. The transmission 10 is particularly suitable for effecting a speed reduction between a prime mover, such as a gas turbine, and the propellers or screws which effect propulsion of a marine vessel. While transmission 10 is particularly useful as part of a marine propulsion assembly, it is not limited thereto since it may have utility in other applications.

The transmission 10 comprises, as shown in FIGS. 1 and 2, a housing or casing 12 within which is disposed a planetary gear assembly 14 and a switching clutch assembly (see FIG. 2) preferably of the synchronous type.

The planetary gear assembly 14 may be of conventional construction or be of the type disclosed in U.S. patent application Ser. No. 290,414, filed Sept. 19, 1972, now U.S. Pat. No. 3,776,067. The planetary gear assembly 14, as shown, comprises a sun gear 18, and a plurality of circumferentially spaced planetary gears 20 disposed in mesh with the sun gear and an internal ring gear 22. The planetary gears are supported for rotation by posts 23 mounted on a carrier 24. The carrier, in turn, is supported for rotation in any suitable manner. As shown in FIG. 2, the carrier may have a tubular hub portion 26 which is supported at one end on an input or drive shaft 28, through a bearing 30, while the opposite end (not shown) is supported for rotation on a pedestal (schematically represented in FIG. 1) in casing 12. As only shown in FIG. 1, carrier 24 is connected to a first output spline 32, while ring gear 22 is connected, through a connecting element 34, such as a spider, to a second output spline 36.

The switching clutch assembly 16 comprises multidisc type clutch subassemblies 38 and 40 which are connected, respectively, to splines 32 and 36, and a switch member 42 which is axially shiftable, as is well known in the art, to alternately bring spline portions 44 and 46 into mesh with splines 32 and 36. The switching member 42 is provided with internal splines 48 which mesh with an output spline 50 so that the output spline is rotated when splines 46 and 36 or splines 44 and 32 are in engagement. The output spline 50 is mounted on a driven shaft 52, such as a propeller shaft, the driven shaft being connected to rotate a propulsion means, such as a screw or propeller (not shown).

In operation, clutch assembly 16 functions to transmit alternately rotation of planetary gear carrier 24 and ring gear 22 to driven shaft 52. When switch member 42 is positioned so that splines 44 and 32 are in mesh, rotation is transmitted from planetary gear carrier 24 to switch member 42, via splines 44 and 32, and, thence, to output spline 50 through the engagement of output spline 50 with splines 48. Similarly, when switch member 42 is positioned to engage splines 46 and 36, rotation is transmitted from ring gear 22 to driven shaft 52, via connecting element 34, splines 36 and 46 and to output spline 50 by reason of the mesh of output spline 50 with splines 48 of switch member 42.

As schematically shown in FIG. 1 and in detail in FIG. 2, alternate transmission of rotation through planetary gear carrier 24 and ring gear 22 of planetary gear assembly 14 is provided for by a friction brake assembly 54.

The friction brake assembly 54 comprises two annular multidisc brake subassemblies or sets 56 and 58. The brake subassembly 56, hereinafter referred to as the reverse or astern mode brake set is connected to the ring gear 22 by a connecting element 60, such as a spider. The connecting element 60 is spline connected at 62 to ring gear 22 (see FIG. 2) and connecting element 34 at splines 64 (see FIG. 2). The brake subassembly 58, hereinafter referred to as the forward mode brake set, is connected to the planetary gear carrier 24 by an annular member 66 which is secured at one end to the hub portion 26 of the planetary gear carrier 24 by bolts 68 (only one of which is shown in FIG. 2). At the opposite end the annular member is bolted, at 70, to the outer brake disc support 72 of forward mode brake set 58. The brake assembly 54 is fixedly secured to a supporting wall 74 which, in turn, is secured by bolts 75 (only one of which is shown in FIG. 2) to casing 12.

The forward mode brake set 58 comprises, in addition to outer support 72, an inner brake disc support 76 which is secured by bolts 78 (only one of which is shown in FIG. 2) to supporting wall 74 in spaced concentric relationship with outer brake disc support 72. A plurality of washer-shaped brake discs 80 are disposed between inner and outer supports 72 and 76, the alternate discs 80 being spline connected to inner and outer supports 72 and 76 so that when the discs 80 are forced into frictional engagement with each other, outer support 72 is secured to support 76.

The reverse mode brake set 56 has, similar to forward mode brake set 58, an inner brake disc support 82 secured by bolts 78 to supporting wall 74. A plurality of washer-shaped brake discs 84 are disposed between inner support 82 and connecting element 60 and are alternately spline connected to the inner support 82 and connecting element 60.

The brake assembly 56 also includes a hydraulic dual cylinder-piston mechanism 90. A piston assembly having dual piston heads 92 and 94 is supported for reciprocative movement in supporting wall 74, which wall also defines two cylinders 96 and 98 for the respective piston heads 92 and 94. The cylinders 96 and 98 are, respectively, aligned with brake discs 84 and 80 so that the pistons 92 and 94 are capable of engaging brake discs 84 and 80. Springs 97 are provided in the piston assembly to bias piston head 92 in a direction toward brake discs 84 (to the left as viewed in FIG. 2) to insure that forward mode brake set 58 is normally in the deactivated or released state. Also in this position shown, piston 92 is also in a position in which reverse mode brake set 56 is disengaged. Pressurized fluid is supplied to and exhausted from each of the cylinders 96 and 98 via suitable passages and ports in supporting wall 74 toward and away from a source of pressurized fluid, such as a pump (not shown). In FIG. 2, only a portion of the passage 100 and port 102 for conducting pressurized liquid to and from cylinder 98 is shown. Through suitable valving (not shown) pressurized liquid flow is alternately controlled to cylinders 96 and 98. A manifold 101 to which a plurality of conduits 104 are connected to communicate the manifold with a source of pressurized fluid (only one being shown in FIG. 2) is secured to supporting wall 74, the manifold serving to channel pressurized fluid to each of the piston chambers 96 and 98 via suitable passageways and ports such as passageway 100 and port 102. When it is desired to conduct pressurized fluid to chamber 96, the fluid passageway 100, and port 102 of chamber 98 serve to return pressurized fluid from chamber 98 for recirculation to the pump (not shown) as piston heads 92 and 94 are moved under the force of pressurized fluid entering chamber 96.

In operation of brake assembly 54 when forward mode propulsion of the marine vessel is desired, suitable switching controls (not shown) are actuated to provide for the flow of pressurized fluid into cylinder 98 of forward mode brake set 58 via passageway 100 and port 102. This hydraulic or pneumatic pressure, acting against piston head 94, forces the piston assembly to the right as viewed in FIG. 2 to axially force brake discs 80 into abutment. This frictional engagement of brake discs 80 connects planetary gear carrier 24 to casing 12, through outer hub 26, annular member 66, outer support 72, inner support 76 and supporting wall 74. Prior to the braking of planetary gear carrier 24, clutch assembly 16 (see FIG. 1) is actuated to index switch member 42 so that splines 46 and 36 are in mesh. This provides for transmission of rotation of ring gear 22, through connecting element 34, clutch subassembly 40, meshing splines 36 and 46, switching member 42, and splines 48, to output spline 50, the output spline 50 driving driven shaft 52. With the switching controls (not shown) actuated to cut off pressurized fluid flow through passage 100 and port 102, cylinder 96 is connected to receive pressurized fluid through a conduit 104, manifold 101 and passages and a port (not shown), piston head 92 is axially forced to the left as viewed in FIG. 2 to thereby release for rotation planetary gear carrier 24 and arrest rotation of ring gear 22. After braking ring gear 22, switch member 42 of clutch assembly 16 is indexed to the right, as viewed in FIG. 1, to bring splines 44 and 32 into mesh. This, thus, provides for transmission of rotation of planetary gear carrier 24 to driven shaft 52 in an opposite direction.

Obviously, it is inefficient to constantly supply pressurized fluid to cylinder 98 to maintain forward mode brake set 58 in the braked condition during prolonged periods of forward propulsion of a marine vessel. Therefore, according to this invention, a mechanical locking means 110 is provided in transmission 10 to hold planetary gear carrier 24 against rotation after forward mode brake set 58 is released or disengaged.

As best shown in FIGS. 3 to 11, locking assembly 110 comprises an engaging coupling 112, a synchronizing coupling 114 carried on the end of a piston assembly 118 by a coupling retainer 142, a coarse pitch set of splines 130 formed on the inner surface of piston 118 and adapted to engage complementary splines 132 on the outer surface of a cylinder 116, a fine pitch set of splines 134 on the inner surface of piston 118, and a lock adapter 136 mounted on cylinder 116 and having splines 138 engaging the splines 134 of piston 118.

The engaging coupling 112 comprises a plurality of splines 140 formed on the distal peripheral surface of a radially extending flange portion of outer support 72.

The piston assembly 118 comprises an annular shaped piston disposed between cylinder 116 which is bolted at 120 to support wall 74 (see FIG. 2) and a second cylinder 126 bolted at 122 to support wall 74 so as to extend in concentric spaced relation to cylinder 116. The cylinders 116 and 126 define therebetween a piston chamber 124 in which the piston head portion 122 is disposed for reciprocative movement. The cylinders 116 and 126 also have juxtaposed annular surfaces 127 and 129, respectively, which engage the shank portion 128 and supports the piston assembly 118 in its reciprocative movement.

The synchronizing coupling 114 is a ring shaped pilot element which is supported on the end of shank portion 128 of piston 118 by coupling retainer 142. The synchronizing coupling 114 has helical splines 144 formed on the outer peripheral surface of the ring element and adapted to mesh with complementary internal splines 146 formed on coupling retainer 142 (see FIG. 6). The coupling 114 also has internal pilot splines 148 which are complementary to splines 134 of piston 118 and splines 140 of engaging coupling 112. The coupling retainer 142 is attached by bolts 150 (only one of which is shown in FIG. 3) to the flanged end portion of piston shank 128.

The coupling retainer 142 includes an annular stop plate 152 and a biasing means in the form of a plurality of spaced spring loaded pins 154 (only one of which is shown). Each of the pins 154 are slidably disposed in a bore in the end shank portion 128 and biased outwardly to engage coupling 114. The pins 154 function to resiliently force coupling 114 into abutment against stop plate 152.

Figure 3:
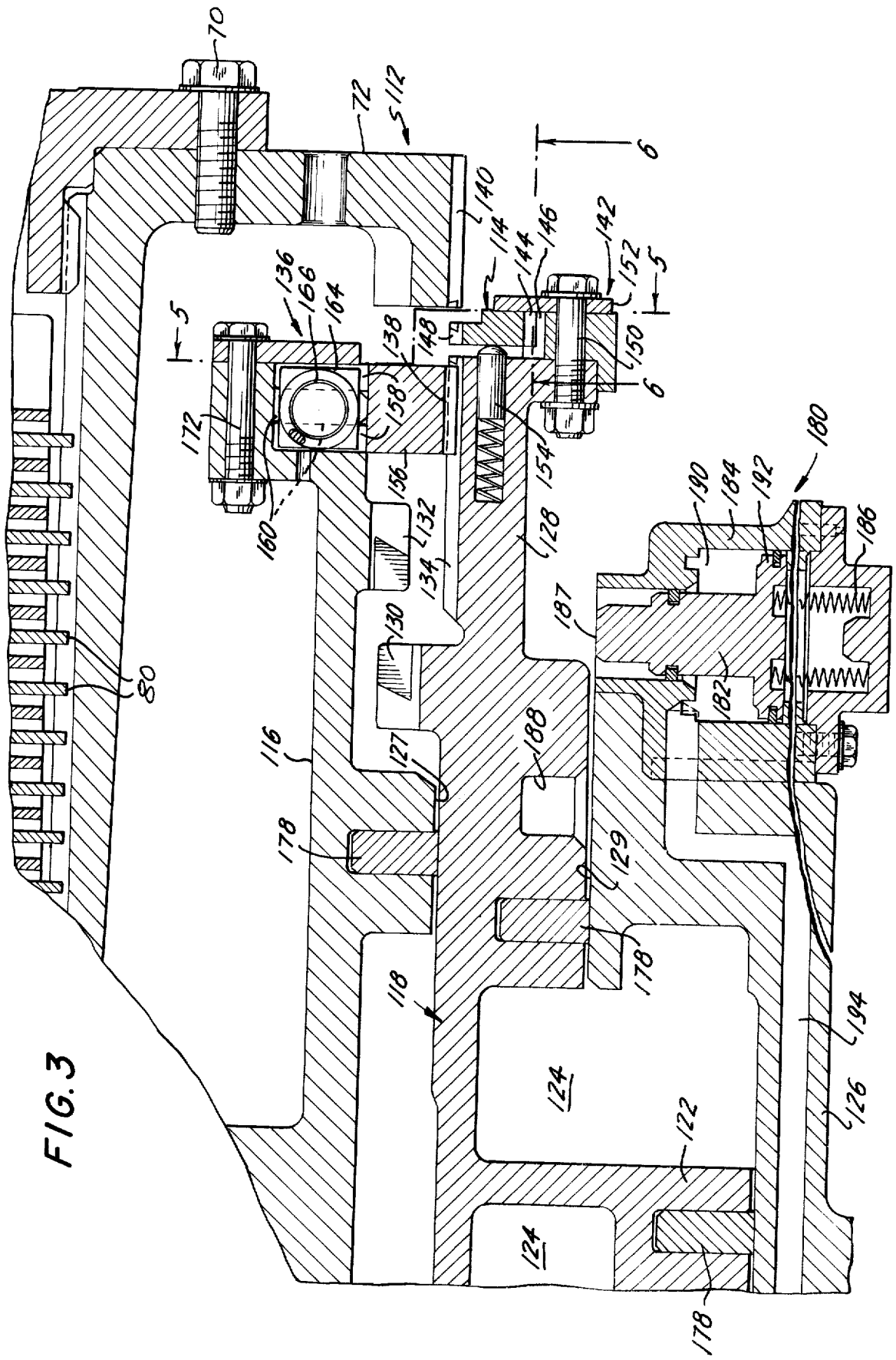
FIG. 3 is a cross-sectional view of the locking mechanism of this invention in the unlocked operative position.
Figure 4:
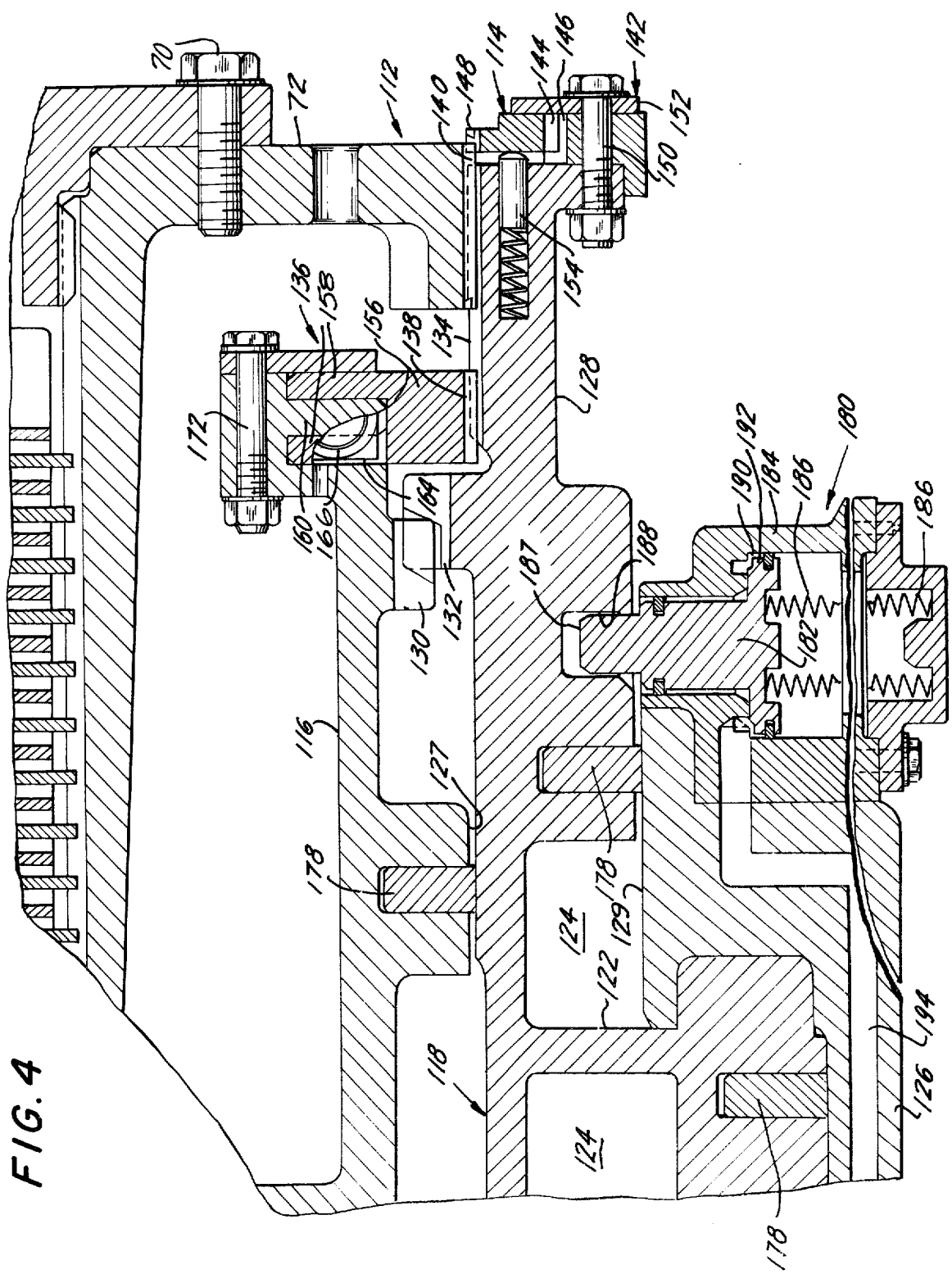
FIG. 4 is a view similar to FIG. 3 showing the locking means in the locked position.
Figure 5:
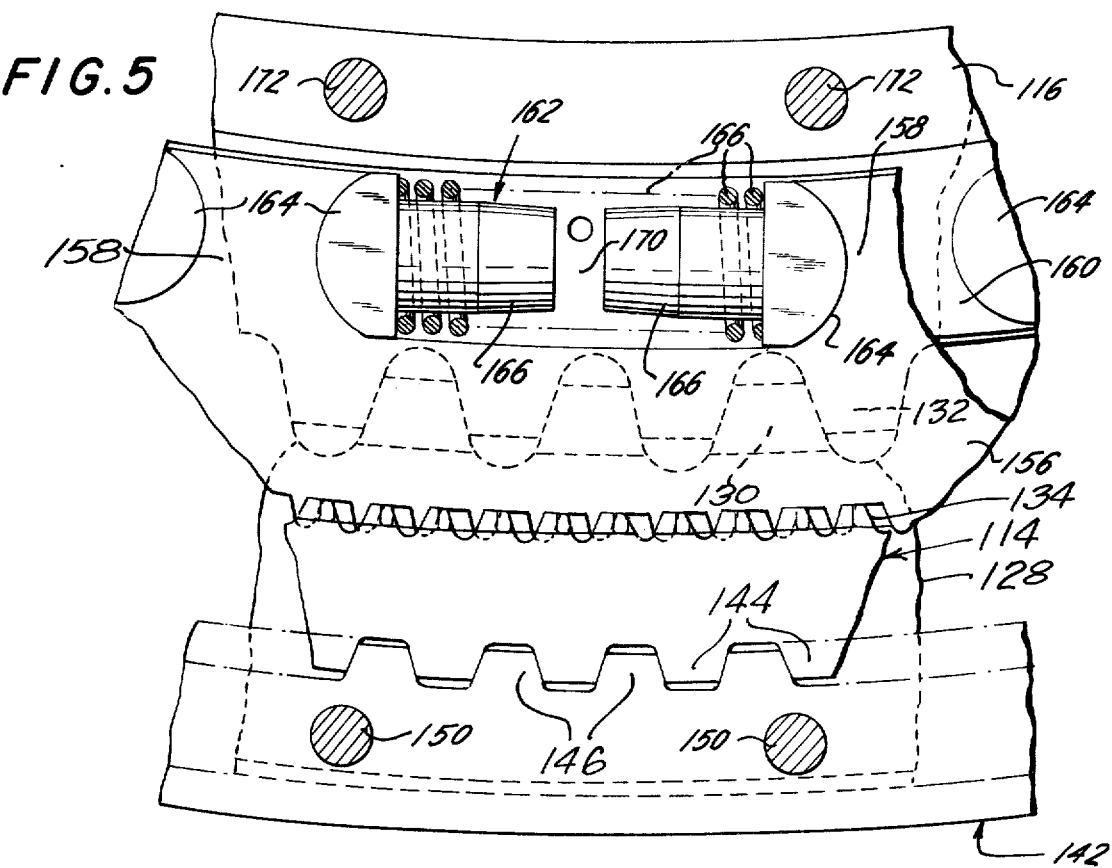
FIG. 5 is a cross-sectional view taken substantially along line 5—5 of FIG. 3, on a somewhat enlarged scale.
Figure 6:
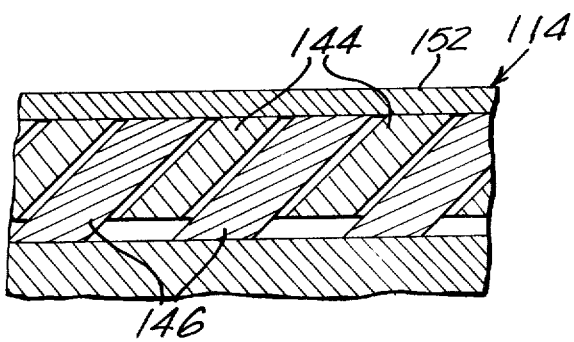
FIG. 6 is a fragmentary view taken substantially along line 6—6 of FIG. 3, somewhat enlarged and rotated 90° relative to FIG. 3.

As best shown in FIGS. 3 and 5, lock adapted 136 comprises a ring element 156 which has splines 138 in its outer peripheral surface. To permit the ring element small, limited rotative movement relative to fixed cylinder 116, such as a maximum of 0.4 to 0.5 inch, the ring element is tangentially biased relative to cylinder 116. In furtherance of this objective, ring element 156 is provided with a plurality of spaced pairs of projections 158 which are circumferentially spaced and extend radially inwardly from the inner peripheral surface thereof, while cylinder 116 has a plurality of circumferentially spaced radial projections 160, similar to projections 158, (only one pair of which is shown in FIG. 4) which extend radially outward from the outer periphery of cylinder 116. The cylinder 116 is constructed and arranged so that each of its projections 160 lie in interjacent relationship with each pair of projections 158. Interposed between next adjacent projections 158 and 160 is a lock and limiting device 162.

Figure 11:
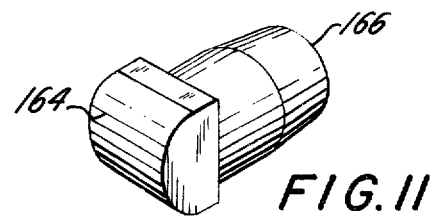
FIG. 11 is a perspective view of the stop pins shown in FIG. 5.

Each of the lock and limiting devices 162 comprises a pair of stop pins 164 biased apart and into abutment against projections 158 and 160 by a spring 166. As best shown in FIGS. 5 and 11, each stop pin 164 has a head portion and a shank portion 166, the head portion abutting both projection 158 and 160. The shank portions are dimensioned in length so as to provide a predetermined space 170 between the ends of the shank portions 166 of each pair of stop pins 164. The spaces 170 permit limited relative rotation between ring element 156 and fixed cylinder 116 until abutment of the ends of the shank portions of stop pins 164. The limited rotative movement of ring element 156 allows limited rotation of piston 118 to achieve proper alignment of splines 134 with respect to splines 140 and thereby permit the splines to be brought into meshing relationship as more fully described hereinafter. Within this limited rotative movement, lock adapter 136 is locked to cylinder 116 for receiving the torque force. A retaining ring 136 is secured by a plurality of circumferentially spaced bolts 172 (only one of which is shown in FIG. 3) to cylinder 116 to confine lock and limiting devices 162 and ring element 156 in assembled relationship.

To actuate locking means 110 to the locked position, as shown in FIG. 4, from the unlocked position shown in FIG. 3, pressurized fluid, such as oil, is conducted, via conduit 174 and passage 176 in support wall 74, into the piston chamber 124 to the left side of piston head 122 as viewed in the drawings. To seal the interstices between the piston 118 and the surfaces of cylinders 116 and 126, suitable seals 178 are provided. To move locking means to the unlocked position shown, pressurized fluid is conducted via suitable conduits, passageways and ports (not shown) to piston chamber 124 to the right side of piston head 122 as viewed in the drawing. As the piston head is urged to the right as viewed in the drawings, pressurized fluid is discharged from the left side of the piston head via passage 176 and conduit 174.

To secure piston 118 in the engaged position as shown in FIG. 4, a hydraulically actuated detent device 180 is attached to the end of cylinder 126. The detent device 180 comprises a piston pin 182 slidably mounted in a housing 184 and biased by springs 186 in a direction toward piston 118. The pin 182 has a reduced end portion 187 which is adapted to engage a recess 188 in the shank portion 128 of piston 118 when the latter is in the fully engaged position (see FIG. 4). The pin 182 is retracted in housing 184 by pressurized fluid conducted to an annular chamber 190 formed by the housing and an enlarged portion 192 of pin 182. The pressurized fluid is conducted from a suitable source thereof (not shown) through passageway 194, communicating at one end with a passage (not shown) similar to passage 176 in support wall 74 and extending through cylinder 126 and housing 184 of the detent device.

As best shown schematically in FIGS. 7 to 10, inclusive, the sequential operation of the locking means to provide sustained forward propulsion of a vessel without the necessity of continuously providing pressurized fluid to piston assembly 90 is as hereinafter described.

Figure 7:
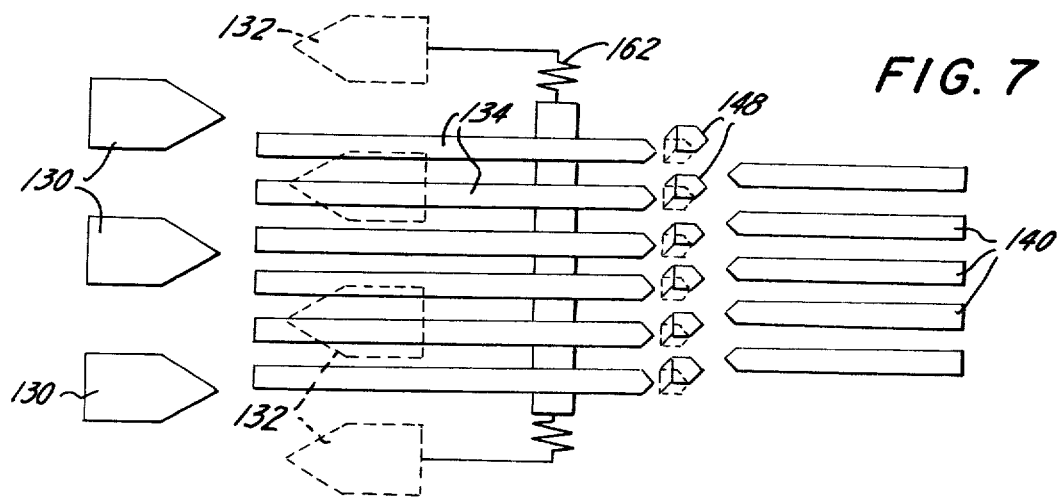
FIGS. 7, 8, 9 and 10 are schematic views of the sequence of operation of the locking mechanism shown in FIGS. 3 to 6.
Figure 8:
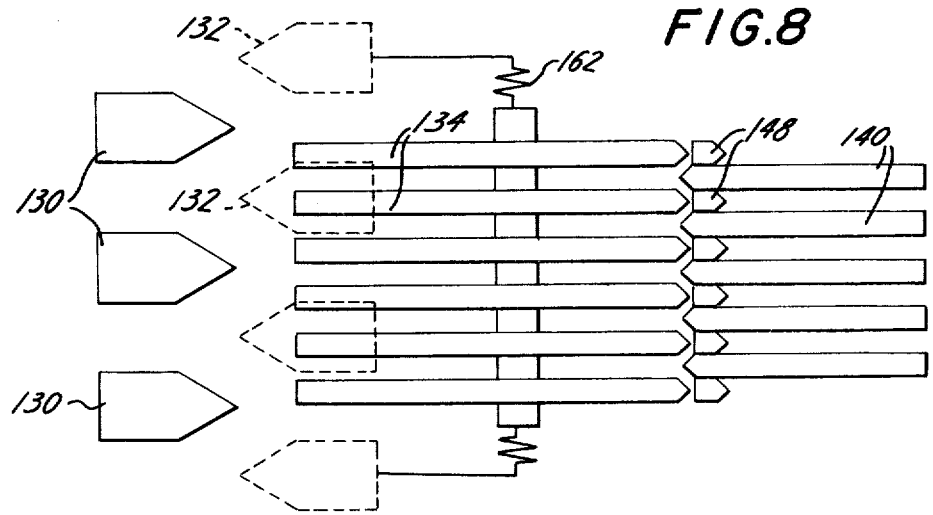
Figure 9:
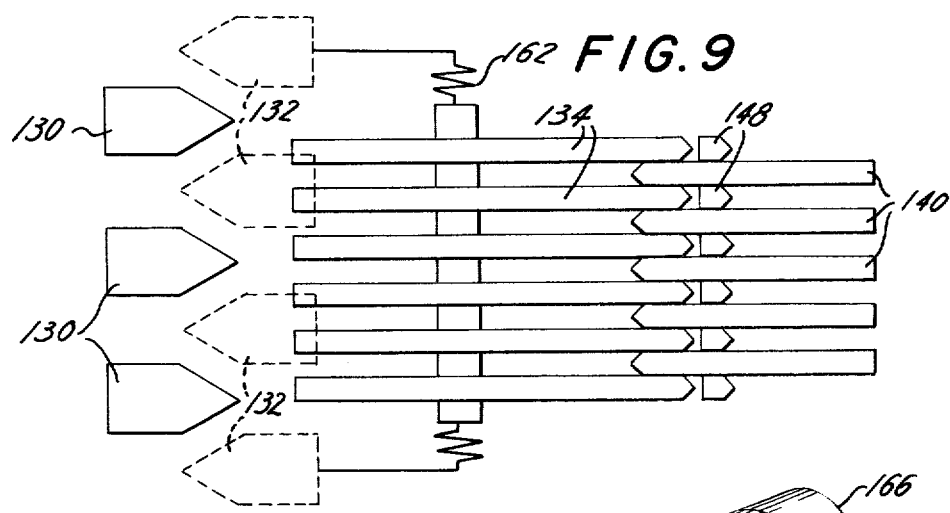

FIG. 7 depicts schematically the relative position of the splines as is shown in detail in FIG. 3. At this time, a control system (not shown) is made operative and automatically provides for flow of pressurized fluid into piston chamber 124 of locking assembly 110 to exert a force on piston 118 in the direction of full disengagement (to the left as viewed in the drawings). Also pressurized fluid is passed into chamber 190 of detent device 180, via conduit 174 passages 176 and 194, to force piston pin 182 into the retracted position. Thereafter, pressurized fluid is allowed to flow into chamber 124 of locking assembly 110, via conduit 174 and passage 176, to exert a force on piston 118 in the direction of full engagement (to the right as viewed in the drawings). Thus, piston 118 is moved so that splines 134 and 140, and splines 130 and 132 are in mesh with each other as shown in FIG. 4 and schematically shown in FIG. 10. The fully engaged position is achieved under whichever one of two conditions exist at the time piston 118 is moved. If in one condition the pilot splines 148 of synchronizing coupling 114 and splines 140 of engaging coupling 112 are in proper alignment for meshing, the splines 134 on piston 118 will be out of line or offset from splines 140 one-fourth pitch. However, upon abutment of splines 134 against splines 140, piston 118 will be rotatively indexed since lock adapter 136, through its lock and limiting devices 162, permits a maximum rotation of its ring element 156 and the piston 118 to which the ring element is spline connected of between 0.4 and 0.5 inch. Thus, splines 134 will be indexed into meshing relationship with splines 140 as shown in FIG. 9. If the pilot splines 148 are not in proper meshing alignment with splines 140, the abutment of splines 148 against splines 140 will cause the synchronizing coupling 114 to be moved relative to coupling retainer 142 and against the force of spring loaded pins 154. This relative movement, through the helical spline interconnection between coupling 114 and coupling retainer 142, causes coupling 114 to rotate into meshing alignment with splines 140. Since pilot splines 148 are offset one-fourth pitch relative to splines 134, when pilot splines 148 are not in alignment, splines 134 of piston 118 are in substantial proper alignment with splines 140 and therefore will mesh therewith.

Figure 10:
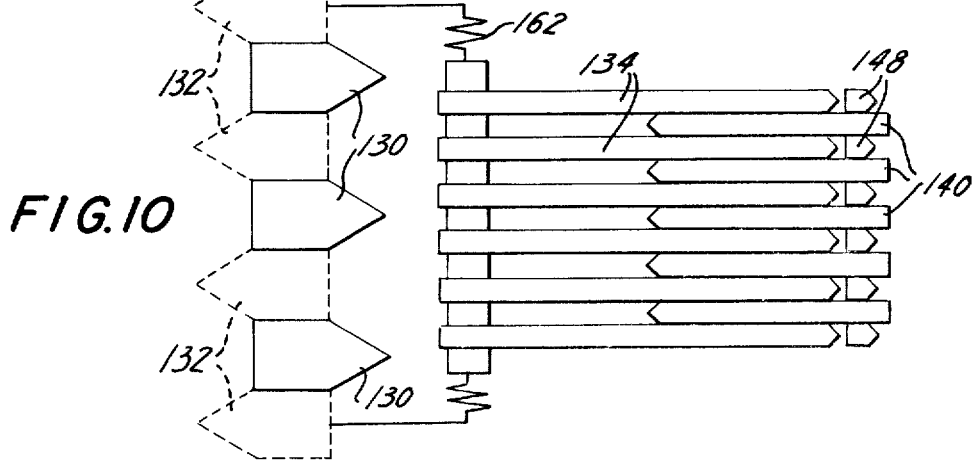

At this point in the sequence of operation, coarse splines 130 and 132, as shown in FIG. 9, are nested but engaged. Pressurized fluid is then bled from chamber 98 of forward mode brake set 58 to slowly disengage brake discs 80 and allow sufficient slippage to bring, as shown in FIG. 10, coarse splines 130 and 132 into engagement before the splines are required to carry the full torque load. Following the engagement of coarse splines 130 and 132, chamber 190 of detent device 180 is vented to relieve the pressure therein so that piston pin 182 is allowed to be extended under the urging of springs 186. The extension of piston pin 182 causes its reduced end portion 187 to enter recess 188 in piston 118 to hold the latter in the fully engaged position. Thereafter, pressurized fluid is fully relieved in both chamber 124 of locking assembly 110 and chamber 98 of the forward mode brake set 58. Thus, planetary gear carrier 24 is restrained against rotation through the mechanical interlock of splines 130 and 132 without continued engagement of forward brake set 58.

The transmission 10 is returned to the forward mode of operation under the control of forward brake set 58, by first passing pressurized fluid to chamber 98 of forward mode brake set 58 to effect engagement of the latter. Thereafter, pressurized fluid is conducted to chamber 190 of detent device 180. This pressurization of chamber 190 effects retraction of piston pin 182 and the removal of its end portion 187 from recess 188. With the piston 118 now unlocked and free to be moved to the disengaged position shown in FIGS. 2, 3 and 7, pressurized fluid is conducted to piston chamber 124 on the side of the piston 122 to urge piston assembly 118 to the disengaged position (in a direction to the left as viewed in the drawings). With splines 130 and 132 and splines 134 and 140 out of mesh, brake assembly 54 is in a condition to be switched from the forward mode of operation to a reverse mode of operation or vice versa.

As best shown in FIGS. 7 to 10, the juxtaposed end portions of the splines 134, 148, 140, 130 and 132 are provided with converging tapered sides to assist the splines in moving into meshing relationship.

It is believed now apparent that the present invention provides a bidirectional planetary gear transmission having a pressurized fluid actuated brake means for effecting different directions of output rotation which can effect efficiently and economically rotation in one direction for prolonged periods. It is a transmission in which the pressurized brake means does not have to be held in an engaged operative condition during prolonged operation in at least one direction of rotation. It is a transmission wherein in at least one direction of rotation the possibility of the inadvertent slippage of the brake means is eliminated.

Although but one embodiment of the invention has been illustrated and described in detail, it is to be expressly understood that the invention is not limited thereto. Various changes can be made in the arrangement of parts without departing from the spirit and scope of the invention as the same will now be understood by those skilled in the art.

What is claimed is:

1. In a bidirectional planetary gear transmission having a housing, an output means connected to the planetary gear assembly disposed in the housing to be rotatively driven by the planetary gear assembly alternately in opposite directions by arresting alternately the planetary gear carrier and the ring gear of the planetary gear assembly and having pressurized fluid friction brake mechanism operative from a disengaged position to an engaged position wherein the planetary gear carrier is connected to the housing to be thereby arrested and cause the planetary gear assembly to effect rotation of the output means in a predetermined direction, the combination of:
  a. a locking means operative in an engaged position to secure the planetary gear carrier to the housing and against rotation thereby permitting said brake mechanism to be disengaged;
  b. said locking means comprising:
    b-1. a first member supported by the housing for reciprocative movement;
    b-2. a second member connected for conjoined rotation with the planetary gear carrier and relative to said first member;
    b-3. a first stop means carried by said first member;
    b-4. a second stop means carried by said second member;
    b-5. actuating means for moving said first member relative to said second member so that said first stop means is brought into rotative alignment with said second stop means to thereby prevent rotation of said second member and gear carrier; and
    b-6. pilot means carried by said first member and coacting with said first and second stop means to guide said first and second stop means into rotative alignment and abutment to prevent rotation of said second member and said planetary gear carrier.

2. The apparatus of claim 1 wherein said first and second stop means each include splines.

3. The apparatus of claim 1 wherein said pilot means comprises camming means operative upon reciprocative movement for rotating said first member a limited amount sufficient to provide rotative alignment of said first and second stop means.

4. The apparatus of claim 1 wherein locking means comprises an annular cylinder connected to the housing and an annular piston disposed for reciprocative movement in said cylinder between an engaged and disengaged position wherein said second member is annular in shape and disposed in axially spaced, concentric relation to said piston, wherein said first and second stop means are a plurality of axially extending spline means which are constructed and arranged to mesh when the piston is reciprocatively moved to an engaged position, and wherein a limiting means is connected to the cylinder and said piston to resiliently limit rotative movement of said piston relative to said second member and said cylinder to an amount sufficient to permit the spline means of the first and second stop means to move into proper position for meshing with each other.

5. The apparatus of claim 4 wherein the spline means of the first and second stop means each comprise a coarse pitch set of splines and a finer pitch set of splines.

* * * * *